United States Patent
Yeung et al.

(10) Patent No.: US 10,448,358 B2
(45) Date of Patent: *Oct. 15, 2019

(54) WEARABLE DEVICE COMMAND REGULATION

(71) Applicant: Intel Corporation, Santa Clara, CA (US)

(72) Inventors: Fai Yeung, Palo Alto, CA (US); Fu Zhou, Bellevue, WA (US); Miril Chheda, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,155

(22) Filed: Jul. 3, 2018

(65) Prior Publication Data

US 2018/0332560 A1    Nov. 15, 2018

Related U.S. Application Data

(63) Continuation of application No. 15/478,279, filed on Apr. 4, 2017, now Pat. No. 10,039,077, which is a (Continued)

(51) Int. Cl.
*H04W 68/00* (2009.01)
*H04W 52/02* (2009.01)
(Continued)

(52) U.S. Cl.
CPC .......... *H04W 68/005* (2013.01); *H04B 1/385* (2013.01); *H04M 1/7253* (2013.01);
(Continued)

(58) Field of Classification Search
CPC ....... H04W 4/021; H04W 4/025; H04W 4/80; H04W 68/005
See application file for complete search history.

(56) References Cited

U.S. PATENT DOCUMENTS 9,622,180 B1 *   4/2017   Yeung .............. H04W 52/0258
10,039,077 B2 *  7/2018   Yeung .............. H04W 52/0258
(Continued)

OTHER PUBLICATIONS

"U.S. Appl. No. 14/757,388, Examiner Interview Summary dated Nov. 28, 2016", 1.

(Continued)

*Primary Examiner* — Diane D Mizrahi
(74) *Attorney, Agent, or Firm* — Schwegman Lundberg & Woessner

(57) ABSTRACT

Systems and methods for regulating alerts in a wearable device are disclosed. The alerts may be generated from a mobile device or a wearable device communicatively coupled to the mobile device. The system may include an alert storage module that receives alerts of various types, and generate a plurality of alert heaps each including respective one or more alerts. The system may determine for an alert a respective cost value associated with issuing a notification of the alert. The alert heaps may be merged to produce a cost-biased leftist heap including prioritized alerts based on the cost values of the alerts. The system may generate a queue of notification commands based on the prioritized alerts, and transmit the commands to the wearable device.

20 Claims, 4 Drawing Sheets

Related U.S. Application Data continuation of application No. 14/757,388, filed on Dec. 23, 2015, now Pat. No. 9,622,180.

(51) Int. Cl.
*H04B 1/3827* (2015.01)
*H04W 4/80* (2018.01)
*H04M 1/725* (2006.01)

(52) U.S. Cl.
CPC ......... *H04W 4/80* (2018.02); *H04W 52/0258* (2013.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/26* (2018.01); *Y02D 70/40* (2018.01)

(56) References Cited

U.S. PATENT DOCUMENTS

| | | |
|---|---|---|
| 2004/0002958 A1 | 1/2004 | Seshadri et al. |
| 2005/0091674 A1 | 4/2005 | Knight et al. |
| 2014/0278091 A1 | 9/2014 | Horvitz et al. |
| 2014/0282586 A1 | 9/2014 | Shear et al. |
| 2016/0034305 A1 | 2/2016 | Shear et al. |
| 2016/0163186 A1* | 6/2016 | Davidson ............... G06Q 50/16 340/506 |
| 2017/0208566 A1 | 7/2017 | Yeung et al. |

OTHER PUBLICATIONS

"U.S. Appl. No. 14/757,388, Non Final Office Action dated Jul. 18, 2016", 10 pgs.

"U.S. Appl. No. 14/757,388, Notice of Allowance dated Nov. 28, 2016", 18 pgs.

"U.S. Appl. No. 14/757,388, Response filed Oct. 14, 2016 to Non Final Office Action dated Jul. 18, 2016", 11 pgs.

"U.S. Appl. No. 15/478,279, Non Final Office Action dated Sep. 28, 2017", 12 pgs.

"U.S. Appl. No. 15/478,279, Notice of Allowance dated Mar. 26, 2018", 5 pgs.

"U.S. Appl. No. 15/478,279, Response filed Jan. 25, 2018 to Non Final Office Action dated Sep. 28, 2017", 7 pgs.

\* cited by examiner

WEARABLE DEVICE COMMAND REGULATION

PRIORITY

This application is a continuation of U.S. patent application Ser. No. 15/478,279, filed Apr. 4, 2017, which is a continuation of U.S. patent application Ser. No. 14/757,388, filed Dec. 23, 2015, all of which are incorporated by reference herein in their entirety.

TECHNICAL FIELD

This document relates generally to relate to wearable devices, and more particularly, to systems and methods for regulating alerts in a wearable device.

BACKGROUND

Mobile devices, such as smartphones and tablets, have functionalities to generate alerts for various events and provide feedback to the user, such as missed calls, calendar appointment, low device power, received email, etc. The feedback may be presented in different formats, including light, sound, or vibration, among others.

Wearable devices that miniature mobile devices that incorporate computers and electronics and may be worn by the user and allow the user to constantly interact with the device. Some wearable devices may communicate with a mobile device such as a smartphone. Wearable devices may include sensors for sensing the device status or user status and produce alerts accordingly. The alerts may be transmitted to the mobile device to create corresponding feedback to the device user.

Generating and processing the alerts and producing the corresponding feedback notification to the user may consume significant power and exhaust the communication and computational resources. In wearable devices, alerts caused by unregulated notifications, such as vibration, are highly undesirable due to fast power depletion as well as potential damages to sensors and other hardware in the devices. Constant issuance of unregulated alerts also downgrades user experience. Regulating the alerts and generating proper notification may extend battery life and enhance the user experience.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Described herein are systems and methods regulating alerts received in a mobile device. The alerts may be generated from the mobile device or a wearable device communicatively coupled to the mobile device. The system may include an alert storage module that receives alerts of various types, and generate a plurality of alert heaps each including respective one or more alerts. The system may determine for an alert a respective cost value associated with issuing a notification of the alert. The plurality of alert heaps may be merged to produce a cost-biased leftist heap including prioritized alerts based on the cost values of the alerts. A queue of notification commands may be generated based on the prioritized alerts, and transmitted to the wearable device.

Figure 1:
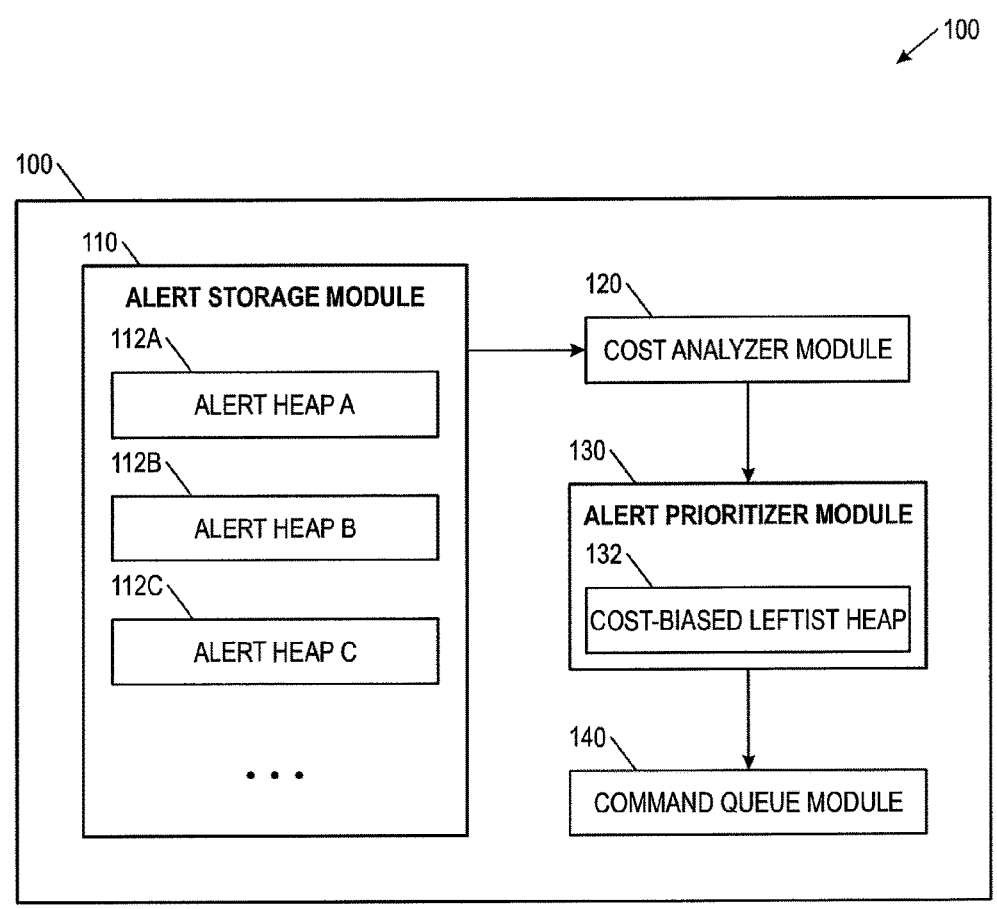
FIG. 1 illustrates, by way of example and not limitation, a diagram of a system for regulating alerts received from a mobile device.

FIG. 1 illustrates, by way of example and not limitation, a diagram of a system 100 for regulating alerts received from a mobile device, such as a smart phone, a tablet, a smartwatch, a smart wristband, smart glasses, or a wearable health monitor, among other portable or wearable devices. The system 100 may include one or more of an alert storage module 110, a cost analyzer module 120, an alert prioritizer module 130, and a command queue module 140. In an example, the system 100 may include a mobile device that includes at least a portion of one or more of the one or more of the modules 110-140. In an example, the modules 110-140 may be implemented in a mobile device such as a smartphone. In an example, the system 100 may include a mobile device (such as a smartphone) and a wearable device (such as a smartwatch) communicatively coupled to the mobile device, and the modules 110-140 may be distributedly implemented and executable between the mobile device and the wearable device.

One or more modules of the system 100 may be implemented as a part of a microprocessor circuit. The microprocessor circuit may be a dedicated processor such as a digital signal processor, application specific integrated circuit (ASIC), microprocessor, or other type of processor for processing information. Alternatively, the microprocessor circuit may be a general purpose processor that may receive and execute a set of instructions of performing the functions, methods, or techniques described herein.

In some examples, one or more modules of the system 100 may be implemented or executed in circuits or sub-circuits. These circuits may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa.

The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The alert storage module 110 may receive alerts from various sources. The alerts may be of various types. In an example, the alerts are generated by an operating system (OS) of a mobile device such as a smartphone or tablet, and may include alerts associated with events such as phone calls, short message service (SMS) or other short text messaging, calendar events alerts, or social events alerts for social media, among others. In an example, the alerts are generated by a mobile application ("App"), or by user activities or user inputs. In another example, the alerts are generated by one or more sensors that provide status of a mobile device, such as battery level, low battery status, temperature of the device, overheat of the device, etc.

The alert storage module 110 may generate a plurality of alert heaps from the alert events. By way of example and not limitation, FIG. 1 illustrates alert heaps 112A-C, each alert heap including one or more alerts of the same type. For example, the alert heap A 112A may include OS-generated alerts, the alert heap B 112B may include App-generated alerts, and the alert heap C 112C may include sensor-generated alerts. In some examples, a plurality of alert storage modules may be included in the system 100, where each storage module may generate a heap of a particular type of alerts.

Each of the alert heaps 112A-C may have a tree-based structure, such as a binary tree structure, where each alert event is represented by a node of the corresponding tree. The heap may be a max heap or a min heap. The alerts in the alert heaps 112A-C may not be arranged in a particular order. Although the alerts are stored and organized in a respective heap as illustrated in FIG. 1, other tree-like data structures may be used, such as binary trees, Adelson-Velsky and Landis' (AVL) trees, or B-trees, among others.

The cost analyzer module 120 may be coupled to the alert storage module 110 to determine for an alert in the alert heaps 112A-C a respective cost value. The cost value may be associated with issuing a particular type of notification, such as lights, sounds, or haptics (e.g., vibration), among others. In some examples, the cost analyzer module 120 may additionally or alternatively determine cost values for a particular type of alerts (as opposed to cost value for an individual alert), such as a cost value for the OS-generated alerts, a cost value for the App-generated alerts, or a cost value for the sensor-generated alerts.

The cost analyzer module 120 may generate a cost value for an alert using information about power consumption or a priority of the underlying event associated with the alert. In an example, the cost value (C) may include one or more of an energy-indicated cost ($C_E$) or a content-indicated cost ($C_P$). The $C_E$ may indicate relative battery power consumption of issuing the notification of the corresponding alert. In an example, the energy-indicated cost $C_E$ for various types of notification may be determined as a product of a unit-time energy cost (or power cost, $C_{pwr}$) and the duration of notification (T), that is, $C_E = C_{pwr} \cdot T$. Table 1 illustrates non-limiting examples of $P_E$ for different types of notification commands.

TABLE 1

Energy-indicated cost for various notifications

| Notification type | Unit-time energy-indicated cost ($C_{pwr}$) |
|---|---|
| Color/light | 10 |
| Transition/LED | 25 |
| Haptics | 50 |

The energy-indicated cost $C_E$, or the unit-time energy-indicated cost $C_{pwr}$, for various types of notification commands may be established in a first lookup table stored in a memory of the system 100. In an example, more than one type of notification may be issued for an alert. The energy-indicated cost $C_E$ may be determined as the summation of the energy cost associated with each notification type involved. For example, the energy-indicated cost for a light remaining lit for a duration of $T_{light}$, an light-emitting diode (LED) transition notification for a duration of $T_{LED}$, and a haptic notification for a duration of $T_{haptic}$ may be determined using Equation (1) as follows:

$$C_E = C_{pwr\text{-}light} \cdot T_{light} + C_{pwr\text{-}LED} \cdot T_{LED} + C_{pwr\text{-}haptic} \cdot T_{haptic} \qquad (1)$$

The content-indicated cost $C_P$ may indicate relative importance of the underlying alert event to the user, time-sensitiveness of the alert event, or the user's preference. The $C_P$ for various types of alerts may be established in a second lookup table stored in a memory of the system 100. Table 2 illustrates non-limiting examples of the $C_P$ for different types of alerts.

TABLE 2

Energy-indicated cost for various alert types

| Alert type | Content-indicated cost ($C_P$) |
|---|---|
| Social | 15 |
| Non-VIP SMS | 10 |
| Non-VIP Calls | 10 |
| Calendar | 5 |
| VIP calls | 2 |
| VIP SMS | 2 |

In some examples, the cost analyzer module 120 may update the $C_P$ for a particular alert type based on user interaction. In an example, the $C_P$ may be updated based on the user's historical usage pattern of the alert. For example, if a user has consistently dismissed "VIP Call" event notifications, the corresponding $C_P$ may be adjusted to a higher value to reflect a lower priority or reduced user preference to be notified by such type of alerts.

The cost value C(x) for an alert x may be determined as a combination of the $C_E(x)$ and $C_P(x)$ of the same alert. In an example, C(x) is a weighted combination of $C_E(x)$ and $C_P(x)$, such as given in Equation (2) below.

$$C(x) = w_E \cdot C_E(x) + w_P \cdot C_P(x) \qquad (2)$$

where $W_E$ and $W_P$ are respective weight factors for $C_E$ and $C_P$. The weight factors may be pre-determined numbers based on historical or empirical data. In an example, the weight factors may be determined based on alert type, or the battery status. For example, a larger $W_E$ may be used if the battery is low, or a larger $W_P$ may be used if the alert events are messages from family members.

The cost value C(x) for an alert event is inversely related to the priority of issuing a notification. For example, a larger C(x) value corresponds to a lower priority of issuing notification for the alert x. A zero cost (i.e., C(x)=0) may be reserved for events for highest importance to the user, or most time-sensitive event requiring the user's immediate attention. Examples of the zero-cost events may include critical battery level, device under catastrophic condition, or critical device system update.

The alert prioritizer module 130 may merge two or more of the plurality of alert heaps such as alert heaps 112A-C, and generate a cost-biased leftist heap 132 at least based on the cost values of the alerts as generated by the cost-analyzer module 120. A leftist heap is a type of tree structure characterized by unbalanced node distribution. The cost-biased leftist heap 132 includes a plurality of nodes each representing an alert from one of the alert heaps 112A-C. Each node is associated with a cost value determined by the cost analyzer module 120. For a particular internal node of the cost-biased leftist heap 132, a left child node of that internal node has a higher cost value than the right child node of that internal node.

Using the cost-biased leftist heap, the alert prioritizer module 130 may perform push, pop, and merging of two or more heaps with a relatively low computational cost. A root node of the cost-biased leftist heap may correspond to an alert with the lowest cost or highest priority (such as a zero-cost alert event). Each time when the highest prioritized (lowest cost) node is extracted and a corresponding notification is issued, the root node may be removed from the cost-biased leftist heap 132, and the left and right child nodes of the removed root node may be merged. The root node extraction and subsequent merging may be repeated, such that an alert sequence may be maintained in a prioritized order.

The alert prioritizer module 130 may manage the size of the cost-biased leftist heap 132 based on the nature of the alert events, such as to save battery and enhance user experience. In an example, the alert prioritizer module 130 may delete from the cost-biased leftist heap 132 one or more leaf nodes associated with cost values greater than a threshold in response to a low battery alert or a critical device status alert, such as when the root note representing a zero-cost low battery alert or critical device status alert has been extracted. In an example, the alert prioritizer module 130 may check for multiple occurrences of the same even type, and add to the cost-biased leftist heap 132 only one alert instead of many alerts associated with the same type of events. For example, alerts associated with multiple missing calls from the same caller are combinable and may be represented by one node in the cost-biased leftist heap 132.

The command queue module 140 may be coupled to the alert prioritizer module 130 to generate a notification command based on the prioritized alerts. The notification command may include at least one of a device light notification command, or a device audio notification command, or a device haptic notification command. The issuance of the notification, such as one or any combination of light, sound, or haptics, may be based on the battery status and the notification type. For example, when the battery is low, the remaining alert commands in the queue may be withheld from issuance and kept in a non-volatile memory. Once a battery is back to normal level, the withheld commands may be retrieved and restored back to command queue for issuance.

Figure 2:
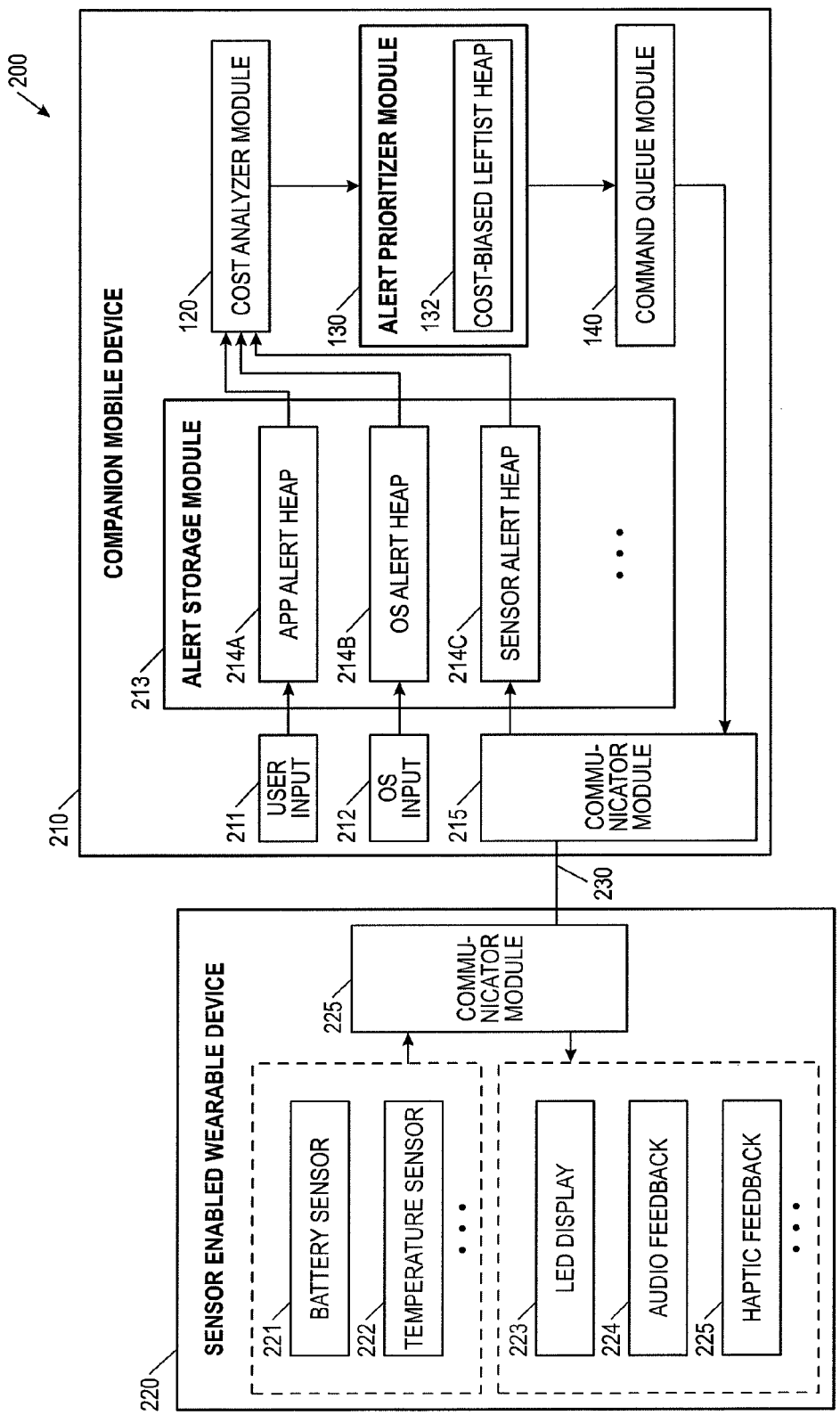
FIG. 2 illustrates, by way of example and not limitation, a diagram of a system for regulating alerts and issuing commands to a wearable device.

FIG. 2 illustrates, by way of example and not limitation, a diagram of a system 200 for regulating alerts and issuing commands to a wearable device. The system 200 includes a companion mobile device 210 and a sensor enable device 220. Examples of the companion mobile device 210 may include a smartphone or a tablet. Examples of the sensor enabled wearable device 220 may include a smartwatch, a smart wristband, smart glasses, or a wearable health monitor, among other portable or wearable devices.

The companion mobile device 210 may be an embodiment of the system 100 in FIG. 1. Similar to the system 100, the companion mobile device 210 may include an alert storage module 213, a cost analyzer module 120, an alert prioritizer module 130, and a command queue module 140. The alert storage module 213, which may be an embodiment of the alert storage module 110, may receive alerts from various sources and generate a respective alert heap for the alerts from the same source. As illustrated in FIG. 2, the companion mobile device 210 may include a user input 211 and an operation system (OS) input 212. The user input 211 may receive user activities or user inputs such as via a mobile application ("App") installed in the mobile device. Such mobile App-generated alerts may be included in an App alert heap 214A. The OS input 212 may generate alerts based on the operating system of the companion mobile device 210, such as phone calls, SMS, or event alerts. The OS-generated alerts may be included in an OS alert heap 214B.

Additionally, the companion mobile device 210 may receive alerts from the sensor enabled wearable device 220. The sensor enabled wearable device 220 may include a battery sensor 221 to sense the battery status in the sensor enabled wearable device 220 and generate the device battery status alert. The sensor enabled wearable device 220 may additionally or alternatively include a temperature sensor 222 to sense temperature of the wearable device 220 and generate the device temperature alert.

The sensor enabled wearable device 220 and the companion mobile device 210 may each have a respective communicator module 225 or 215 to establish a communication between the sensor enabled wearable device 220 and the companion mobile device 210 through a communication link 230. The communication link may include a wired connection including universal serial bus (USB) connection, micro USB connection, or other wired connection. Alternatively, the communication link may include a wireless connection including Bluetooth protocol, Bluetooth low energy (BLE) protocol, Ethernet, IEEE 802.11 wireless, an inductive telemetry link, or a radio-frequency telemetry link, among others. One or more of the battery status alert and the device temperature alert generated by the respective sensors in the sensor enabled wearable device 220 may be transmitted to the companion mobile device 210 via the communication link 230, and be used to generate a sensor alert heap 214C.

The cost analyzer module 120 may determine for the alerts in the alert heaps 214A-C a respective cost value, such as according to Equations (1) and (2) as previously discussed with reference to FIG. 1. The alert prioritizer module 130 may merge two of more of the alert heaps 214A-C to generate a cost-biased leftist heap that includes prioritized alerts based on the cost values of the alerts. In an example, the alert prioritizer module 130 may merge the application alert heap 214A and the OS alert heap 214B to generate a cost-biased leftist heap 132. In another example, the alert prioritizer module 130 may merge the application alert heap 214A, the OS alert heap 214B, and the sensor alert heap 214C to generate a cost-biased leftist heap 132. The command queue module 140 may generate notification commands based on the prioritization of the alerts.

The notification commands may be communicated to the wearable device 220 using the communicators 215 and 225 via the communication link 230. In an example, when the battery level of the mobile device falls below a threshold indicating low battery status, the command queue module 140 may withhold the transmission of the notification commands, and store the notification commands in a non-volatile memory. When the battery is back to normal level, the command queue module 140 may retrieve the notification commands and resume the transmission of the notification commands. In an example, the command queue module 140 may examine hardware specific constraints such as mandatory delay between two consecutive alerts or maximum duration for light or haptics to determine time of transmitting the notification command to the sensor enabled wearable device 220. The sensor enabled wearable device 220 may include one or more output modules to produce a human-perceptible presentation in response to the notification commands, such as a light-emitting diode (LED) display 223, device audio feedback 224, or haptic feedback 225. The notification command may also include patterns for each mode of presentation. For example, the LED display 223 may light up according to RGB565 format, with various intensity levels as specified by the notification command. In an example, four different types of LED patterns may be played, including none, fixed, blink and wave. In another example, haptic feedback or vibration pattern commands included in the notification command may have two types of patterns to be played, including none and square.

Figure 3:
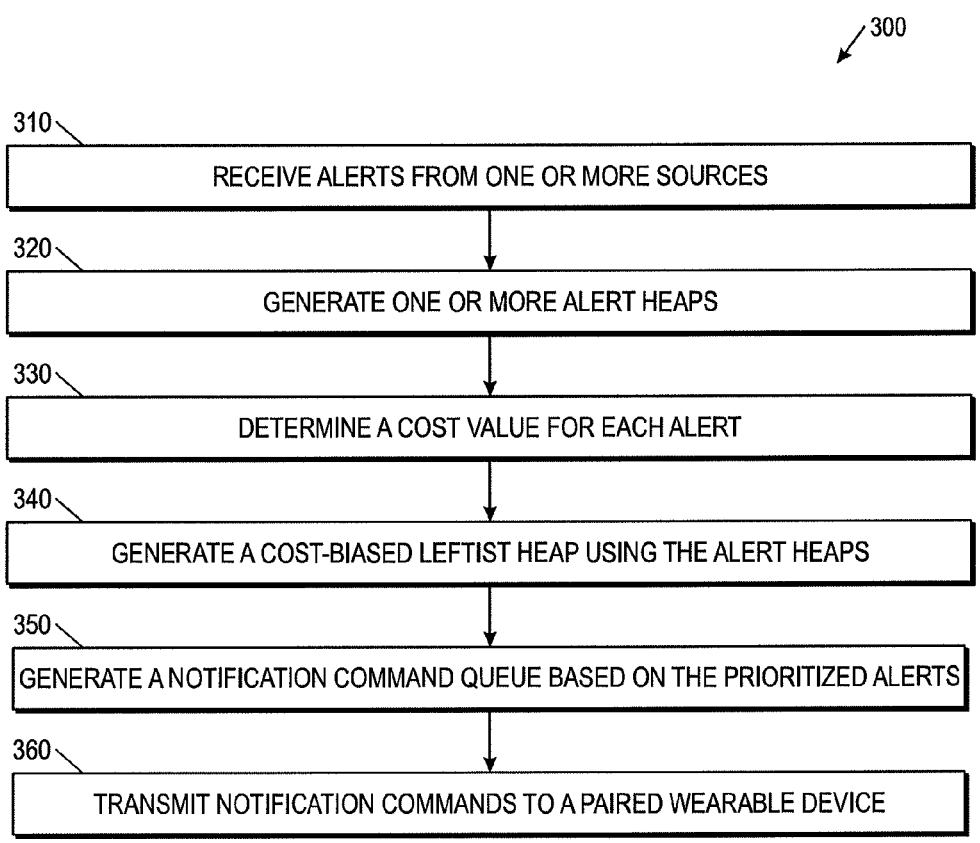
FIG. 3 illustrates, by way of example and not limitation, an example of a method for regulating alerts such as received from a mobile device.

FIG. 3 illustrates, by way of example and not limitation, an example of a method 300 for regulating alerts such as received from a mobile device. The method 300 may be implemented and executable in the system 100 or a modification thereof. In an example, the method 300 may be implemented and executable in a mobile device such as a smartphone. In another example, the method 300 may be distributedly implemented between a mobile device and a wearable device communicatively coupled to the mobile device, such as a smartwatch, a smart wristband, smart glasses, or a wearable medical and health monitor.

The method 300 begins at 310 with receiving alerts from one or more sources. The alerts may be generated by an operating system (OS) of a mobile device. Such alerts may be associated with events such as phone calls, SMS, or calendar or social events. The alerts may additionally or alternatively include user activities or user inputs such as generated by a mobile App. The alerts may additionally be generated from a wearable device communicatively coupled to the mobile device, such as the sensor enabled wearable device 220 in FIG. 2. Examples of the sensor-generated alerts may be associated with events such as battery level, low battery status, temperature of the device, overheat of the device, etc.

At 320, a plurality of alert heaps may be generated, such as using the alert storage module 110 in FIG. 1 or the alert storage module 213 in FIG. 2. Each alert heap may include one or more alerts of the same type, such as the App alert heap 214A, the OS alert heap 214B, and the sensor alert heap 214C, as illustrated in FIG. 2.

At 330, a cost value may be determined for an alert, such as using the cost analyzer module 120. The cost value may be associated with issuing a particular type of notification, such as lights, sounds, or haptics. In an example, the cost value may be determined using an energy-indicated cost ($C_E$) indicative of relative battery power consumption of issuing the notification of the corresponding alert, and a content-indicated cost ($C_P$) indicative of relative importance of the underlying alert event to the user, time-sensitiveness of the alert event, or the user's preference. In an example, the cost value for an alert may be determined as a weighted combination of the $C_E$ and $C_P$, such as according to the Equations (1) and (2) as previously discussed. The cost value thus computed may be inversely related to the priority of issuing a corresponding a notification. A larger cost value indicates a lower priority of notification. Events such as critical battery level, device under catastrophic condition, or critical device system update may be assigned a cost value of zero, due to the highest importance to the user, or most time-sensitive event requiring the user's immediate attention.

At 340, a cost-biased leftist heap may be generated such as using the alert prioritizer module 130. The cost-biased leftist heap may include a plurality of nodes each representing an alert from one of the alert heaps. Each node is associated with a cost value. A root node of the cost-biased leftist heap corresponds to an alert with the lowest cost or highest priority. Each time when the highest prioritized (lowest cost) node is extracted and a corresponding notification is issued, the root node may be removed from the cost-biased leftist heap, and left and right child of the removed root node may be merged. The root node extraction and subsequent merging may be repeated, such that an alert sequence may be maintained in a prioritized order.

In an example, in response to a low battery alert or a critical device status alert, one or more leaf nodes associated with cost values greater than a threshold may be removed from the cost-biased leftist heap. In an example, multiple occurrences of the same type of alert event may be monitored, and only one alert—instead of many alerts associated with the same event type—may be added to the cost-biased leftist heap.

At 350, a notification command queue may be generated based on the prioritized alerts, such as using the command queue module 140. The issuance of the notification, such as one or any combination of light, sound, or haptics, may be based on the battery status and the notification type. In response to a detection of low battery status such as when the battery level of the mobile device falls below a threshold, the remaining alert commands in the queue may be withheld from issuance and kept in a non-volatile memory. The withheld commands may be retrieved and restored back to command queue for issuance when the battery is back to normal level.

At 360, the notification commands may be transmitted to a wearable device (such as a smartwatch) paired or communicatively connected to the mobile device via a wired or wireless connection. In an example, the wearable device may be communicatively coupled to the mobile device (such as a smartphone) via a Bluetooth low energy (BLE) protocol. In an example, transmission of the notification command to the wearable device may be based on hardware specific constraints such as mandatory delay between two consecutive alerts or maximum duration for light or haptics. The notification command may also include patterns for each mode of presentation, such as intensity levels of a LED, patterns of LED (including none, fixed, blink and wave), or patterns of haptic feedback (including none and square), among others.

Figure 4:
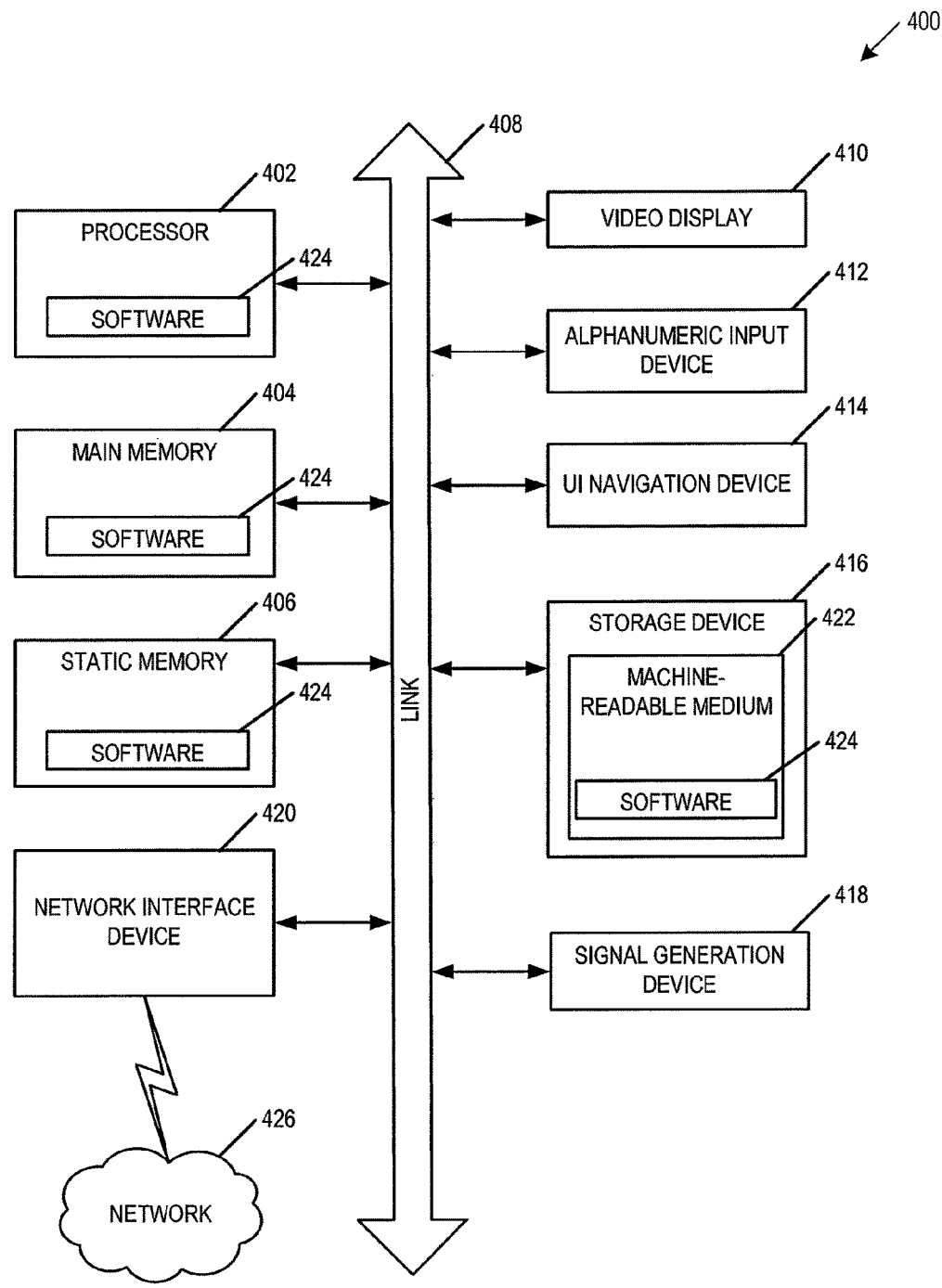
FIG. 4 illustrates, by way of example of not limitation, a block diagram illustrating an example machine upon which any one or more of the techniques discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 224 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media. In an example, the instructions 424 stored in the machine-readable storage medium 422 include instructions causing the computer system 400 to receive alerts from one or more sources, generate a plurality of alert heaps, determine a cost value for an alert, generate a cost-biased leftist heap using the alert heaps, and to generate a notification command queue based on the prioritized alerts. The instructions 424 may further include instructions causing computer system 400 to establish a communication link, such as a Bluetooth low energy protocol, between a mobile device and a wearable device, and to transmit notification commands to the wearable device.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 4424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In this document, embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

ADDITIONAL NOTES & EXAMPLES

Example 1 is a system for regulating alerts received in a mobile device. The system comprises: an alert storage module to receive alerts and generate a plurality of alert heaps each including respective one or more alerts; a cost analyzer module to determine for an alert a respective cost value associated with issuing a notification of the alert; an alert prioritizer module to merge the plurality of alert heaps to generate a cost-biased leftist heap including prioritized alerts at least based on the cost values of the alerts in the plurality of alert heaps; and a command queue module coupled to the alert prioritizer module to generate notification commands based on the prioritized alerts.

In Example 2, the subject matter of Example 1 optionally includes the alert storage module that may generate an application alert heap, an operation system (OS) alert heap, and a sensor alert heap. The application alert heap may include alerts associated with application of the mobile device. The OS alert heap may include alerts generated by an OS of the mobile device. The alert prioritizer module may generate the cost-biased leftist heap by merging two or more of the application alert heap, the OS alert heap, or the sensor alert heap.

In Example 3, the subject matter of Example 2 optionally includes the sensor alert heap that may include one or more of a device battery status alert or a device temperature alert.

In Example 4, the subject matter of any one or more of Examples 1-3 optionally includes the mobile device that may include one or more of the alert storage module, the cost analyzer module, the alert prioritizer module, or the command queue module.

In Example 5, the subject matter of Example 4 optionally includes the mobile device that may include a communicator module to receive alerts from a wearable device through a communication link, and to transmit the notification commands to the wearable device through the communication link.

In Example 6, the subject matter of Example 5 optionally includes the wearable device that may include a battery status sensor to sense a status of a battery in the wearable device and generate a device battery status alert.

In Example 7, the subject matter of Example 5 optionally includes the wearable device that may include a temperature sensor to sense temperature of the wearable device and generate a device temperature alert.

In Example 8, the subject matter of Example 5 optionally includes the wearable device that may communicate with the mobile device through a wireless connection including a Bluetooth low energy communication protocol.

In Example 9, the subject matter of Example 5 optionally includes the wearable device that may include one or more output modules to produce a human-perceptible notification in response to the notification commands.

In Example 10, the subject matter of Example 5 optionally includes optionally includes the command queue module that may transmit the notification commands to the wearable device based on a battery level of the mobile device.

In Example 11, the subject matter of Example 10 optionally includes the command queue module that may withhold the transmission of the notification commands when the battery level of the mobile device falls below a threshold indicating low battery status, and resume the transmission of the notification commands when the battery level of the mobile device is above the threshold.

In Example 12, the subject matter of Example 10 optionally includes the command queue module that may further store the notification commands in a non-volatile memory when the battery level is below the threshold level.

In Example 13, the subject matter of Example 10 optionally includes the command queue module that may transmit the notification commands to the wearable device further based on a hardware-specific constraint.

In Example 14, the subject matter of Example 13 optionally includes the hardware-specific constraint that may include a mandatory delay between two consecutive alerts.

In Example 15, the subject matter of Example 13 optionally includes the hardware-specific constraint that may include a maximum duration in time of a notification.

In Example 16, the subject matter of any one or more of Examples 1-3 optionally includes the notification commands that may include one or more of a device light notification command, a device haptic notification command, or a device audio notification command.

In Example 17, the subject matter of any one or more of Examples 1-3 optionally includes the cost analyzer module that may determine the respective cost value using a respective energy-indicated cost and a respective content-indicated cost. The respective energy-indicated cost may indicate relative battery power consumption of issuing a notification of the corresponding alert, and the respective content-indicated cost may indicate relative user preference to a content of the corresponding alert.

In Example 18, the subject matter of Example 17 optionally includes a memory to store a first lookup table of an association between the energy-indicated cost and types of notification commands, and a second lookup table of an association between the content-indicated cost and types of alerts, wherein the cost analyzer module may update the second lookup table based on a historical usage pattern of an alert.

In Example 19, the subject matter of Example 17 optionally includes the cost analyzer module that may determine the respective cost value using a weighted combination of the respective energy-indicated cost and the respective content-indicated cost.

In Example 20, the subject matter of any one or more of Examples 1-3 optionally includes the cost-biased leftist heap that may include a root node and a plurality of leaf nodes, the root node representing an alert with a lower cost value than any other alerts represented by the plurality of the leaf nodes.

In Example 21, the subject matter of Example 20 optionally includes the alert prioritizer module that may remove from the cost-biased leftist heap one or more leaf nodes associated with cost values greater than a threshold in response to a low battery alert or a critical device status alert.

In Example 22, the subject matter of Example 20 optionally includes the alert prioritizer module that may add to the cost-biased leftist heap one alert associated with multiple occurrences of the same event type.

Example 23 is a method for regulating alerts received in a mobile device. The method comprises: receiving alerts from a mobile device; generating a plurality of alert heaps each including respective one or more alerts; determining for an alert a respective cost value associated with issuing a notification of the alert; generating a cost-biased leftist heap including prioritized alerts at least based on the cost values of the alerts in the plurality of alert heaps; and generating a queue of notification commands based on the prioritized alerts.

In Example 24, the subject matter of Example 23 optionally includes the plurality of alert heaps that may include an application alert heap, an operation system (OS) alert heap, and a sensor alert heap. The application alert heap may include alerts associated with application of the mobile device. The OS alert heap may include alerts generated by an OS of the mobile device. The cost-biased leftist heap may be generated by merging two or more of the application alert heap, the OS alert heap, or the sensor alert heap.

In Example 25, the subject matter of Example 24 optionally includes the sensor alert heap that may include one or more of a device battery status alert or a device temperature alert.

In Example 26, the subject matter of any one or more of Examples 23-25 optionally includes: establishing a communication link between the mobile device and a wearable device; receiving one or more alerts from the wearable device through the communication link; and transmitting the notification commands to the wearable device through the communication link.

In Example 27, the subject matter of Example 26 optionally includes the alerts received from the wearable device that may include a device battery status alert generated in response to a battery level of the wearable device falls below a threshold.

In Example 28, the subject matter of Example 26 optionally includes the alerts received from the wearable device that may include a device temperature alert generated in response to temperature of the wearable device exceeds a threshold.

In Example 29, the subject matter of Example 26 optionally includes the communication link between the mobile device and the wearable device that may include a Bluetooth low energy communication protocol.

In Example 30, the subject matter of Example 26 optionally includes producing a human-perceptible notification in response to the notification commands.

In Example 31, the subject matter of Example 26 optionally includes the transmission of the notification commands to the wearable device that may be based on a battery level of the mobile device.

In Example 32, the subject matter of Example 31 optionally includes transmitting the notification commands to the wearable device that may include: withholding the transmission of the notification commands when the battery level of the mobile device falls below a threshold indicating low battery status; and resuming the transmission of the notification commands when the battery level of the mobile device is above the threshold.

In Example 33, the subject matter of Example 32 optionally includes storing the notification commands in a non-volatile memory when the battery level is below the threshold level.

In Example 34, t the subject matter of Example 31 optionally includes the transmission of the notification commands that may be further based on a hardware-specific constraint.

In Example 35, the subject matter of Example 34 optionally includes the hardware-specific constraint that may include mandatory delay between two consecutive alerts.

In Example 36, the subject matter of Example 34 optionally includes the hardware-specific constraint that may include a maximum duration in time of a notification.

In Example 37, the subject matter of any one or more of Examples 23-25 optionally includes the notification commands that may include one or more of a device light notification command, a device haptic notification command, or a device audio notification command.

In Example 38, the subject matter of any one or more of Examples 23-25 optionally includes the respective cost value that may be determined using a respective energy-indicated cost and a respective content-indicated cost. The respective energy-indicated cost indicates relative battery power consumption of issuing a notification of the corresponding alert, and the respective content-indicated cost indicates relative user preference to a content of the corresponding alert.

In Example 39, the subject matter of Example 38 optionally includes creating and storing in a memory a first lookup table of an association between the energy-indicated cost and types of notification commands, and a second lookup table of an association between the content-indicated cost and types of alerts; and updating the second lookup table based on a historical usage pattern of an alert.

In Example 40, the subject matter of Example 38 optionally includes the respective cost value that may be determined using a weighted combination of the respective energy-indicated cost and the respective content-indicated cost.

In Example 41, the subject matter of any one or more of Examples 23-25 optionally includes the cost-biased leftist heap that may include a root node and a plurality of leaf nodes, the root node representing an alert with a lower cost value than any other alerts represented by the plurality of the leaf nodes.

In Example 42, the subject matter of Example 41 optionally includes generating the cost-biased leftist heap that may include removing from the cost-biased leftist heap one or more leaf nodes associated with cost values greater than a threshold in response to a low battery alert or a critical device status alert.

In Example 43, the subject matter of Example 41 optionally includes generating the cost-biased leftist heap that may include adding to the cost-biased leftist heap one alert associated with multiple occurrences of the same event type.

Example 44 is at least one computer-readable storage medium that comprises instructions to perform any of the methods of Examples 23 through 43.

Example 45 is a system comprising means for performing any of the methods of Examples 23 through 43.

Example 46 is a system for regulating alerts received in a mobile device. The system comprises: means for receiving alerts from a mobile device; means for generating a plurality of alert heaps each including respective one or more alerts; means for determining for an alert a respective cost value associated with issuing a notification of the alert; means for generating a cost-biased leftist heap including prioritized one or more alerts at least based on the cost values of the alerts in the plurality of alert heaps; and means for generating a queue of notification commands based on the prioritized alerts.

In Example 47, the subject matter of Example 46 optionally includes the plurality of alert heaps that may include an application alert heap, an operation system (OS) alert heap, and a sensor alert heap. The application alert heap may include alerts associated with application of the mobile device. The OS alert heap may include alerts generated by an OS of the mobile device. The means for generating the cost-biased leftist heap may include means for merging two or more of the application alert heap, the OS alert heap, or the sensor alert heap.

In Example 48, the subject matter of Example 47 optionally includes the sensor alert heap that may include one or more of a device battery status alert or a device temperature alert.

In Example 49, the subject matter of any one or more of Examples 46-48 optionally includes: means for establishing a communication link between the mobile device and a wearable device; means for receiving one or more alerts from the wearable device through the communication link; and means for transmitting the notification commands to the wearable device through the communication link.

In Example 50, the subject matter of Example 49 optionally includes, wherein the alerts received from the wearable device includes a device battery status alert generated in response to a battery level of the wearable device falls below a threshold.

In Example 51, the subject matter of Example 49 optionally includes the alerts received from the wearable device that may include a device temperature alert generated in response to temperature of the wearable device exceeds a threshold.

In Example 52, the subject matter of Example 49 optionally includes the communication link between the mobile device and the wearable device that may include a Bluetooth low energy communication protocol.

In Example 53, the subject matter of Example 49 optionally includes means for producing a human-perceptible notification in response to the notification commands.

In Example 54, the subject matter of Example 49 optionally includes the means for transmitting the notification commands to the wearable device that may include means for transmission based on a battery level of the mobile device.

In Example 55, the subject matter of Example 54 optionally includes the means for transmitting the notification commands to the wearable device that may include: means for withholding the transmission of the notification commands when the battery level of the mobile device falls below a threshold indicating low battery status; and means for resuming the transmission of the notification commands when the battery level of the mobile device is above the threshold.

In Example 56, the subject matter of Example 55 optionally includes means for storing the notification commands when the battery level is below the threshold level.

In Example 57, the subject matter of Example 54 optionally includes the means for transmitting the notification commands to the wearable device that may include means for transmission further based on a hardware-specific constraint.

In Example 58, the subject matter of Example 57 optionally includes the hardware-specific constraint that may include a mandatory delay between two consecutive alerts.

In Example 59, the subject matter of Example 57 optionally includes the hardware-specific constraint that may include a maximum duration in time of a notification.

In Example 60, the subject matter of any one or more of Examples 46-48 optionally includes the notification commands that may include one or more of a device light notification command, a device haptic notification command, or a device audio notification command.

In Example 61, the subject matter of any one or more of Examples 46-48 optionally includes the means for determining the respective cost value that may include means for determining a respective energy-indicated cost and a respective content-indicated cost. The respective energy-indicated cost indicates relative battery power consumption of issuing a notification of the corresponding alert, and the respective content-indicated cost indicates relative user preference to a content of the corresponding alert.

In Example 62, the subject matter of Example 61 optionally includes means for creating and storing in a memory a first lookup table of an association between the energy-indicated cost and types of notification commands, and a second lookup table of an association between the content-indicated cost and types of alerts, and means for updating the second lookup table based on a historical usage pattern of an alert.

In Example 63, the subject matter of Example 61 optionally includes the means for determining the respective cost value that may include means for producing a weighted combination of the respective energy-indicated cost and the respective content-indicated cost.

In Example 64, the subject matter of any one or more of Examples 46-48 optionally includes the cost-biased leftist heap that may include a root node and a plurality of leaf nodes, the root node representing an alert with a lower cost value than any other alerts represented by the plurality of the leaf nodes.

In Example 65, the subject matter of Example 64 optionally includes the means for generating the cost-biased leftist heap that may include means for removing from the cost-biased leftist heap one or more leaf nodes associated with cost values greater than a threshold in response to a low battery alert or a critical device status alert.

In Example 66, the subject matter of Example 64 optionally includes the means for generating the cost-biased leftist heap that may include means for adding to the cost-biased leftist heap one alert associated with multiple occurrences of the same event type.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A mobile device for regulating alerts, comprising:
one or more microprocessors configured to execute instructions to:
determine a cost value for an alert using one or more of information about power consumption of issuing an alert notification or an event priority indicator associated with the alert;
prioritize alerts at least based on the cost values of the alerts; and
generate notification commands based on the prioritized alerts.

2. The mobile device of claim 1, wherein the information about power consumption includes an amount of power consumption of issuing one or more notification types including a light notification, a light-emitting diode transition notification, or a haptic notification.

3. The mobile device of claim 2, wherein the information about power consumption includes, for each of the one or more notification types, a unit-time energy-indicated cost and a duration for activating the corresponding notification type.

4. The mobile device of claim 1, wherein the event priority indicator includes a numerical priority value of an event associated with the alert.

5. The mobile device of claim 1, wherein the one or more microprocessors are configured to execute instructions to determine the cost value for an alert using a combination of the information about power consumption of issuing the alert notification and the event priority indicator associated with the alert.

6. The mobile device of claim 5, wherein the combination includes a linear combination using weight factors for the information about power consumption and weight factors for the event priority indicator.

7. The mobile device of claim 6, wherein the weight factors are determined based on a battery status of the mobile device.

8. The mobile device of claim 1, further comprising a memory to store a first lookup table of unit-time energy-indicated cost associated with one or more notification types, and a second lookup table of event priority indicators associated with one or more alert types.

9. The mobile device of claim 8, wherein the one or more microprocessors are configured to execute instructions to update the second lookup table based on a historical usage pattern of an alert.

10. The mobile device of claim 1, wherein the one or more microprocessors are configured to execute instructions to generate a plurality of alert heaps each including respective one or more alerts, and to merge the plurality of alert heaps to generate a cost-biased leftist heap based on the cost values of the alerts in the plurality of alert heaps.

11. The mobile device of claim 10, wherein the plurality of alert heaps includes two or more of an application alert heap, an operation system (OS) alert heap, or a sensor alert heap.

12. The mobile device of claim 10, wherein the one or more microprocessors are configured to execute instructions to remove from the cost-biased leftist heap one or more leaf nodes associated with cost values greater than a threshold in response to a low battery alert or a critical device status alert.

13. A method for regulating alerts received in a mobile device, the method comprising:
receiving alerts from a mobile device;
determining, for each of the received alerts, a cost value using one or more of information about power consumption of issuing an alert notification or an event priority indicator;
prioritizing the alerts at least based on the cost values of the alerts; and
generating a queue of notification commands based on the prioritized alerts.

14. The method of claim 13, wherein the information about power consumption includes power consumption of issuing one or more notification types including a light notification, a light-emitting diode transition notification, or a haptic notification.

15. The method of claim 13, wherein determining the cost value for each of the received alerts includes using a linear combination of the information about power consumption of issuing the alert notification and the event priority indicator associated with the alert each scaled by respective weight factors.

16. The method of claim 15, comprising determining the respective weight factors based on a battery status of the mobile device.

17. At least one non-transitory machine-readable storage medium, comprising a plurality of instructions that, responsive to being executed with processor circuitry of a computing device, cause the computing device to:
 receive alerts from a mobile device;
 determine, for each of the received alerts, a cost value using one or more of information about power consumption of issuing an alert notification or an event priority indicator;
 prioritize the alerts at least based on the cost values of the alerts; and
 generate a queue of notification commands based on the prioritized alerts.

18. The non-transitory machine-readable storage medium of claim 17, wherein the operation that determines the cost value for each of the received alerts includes an operation that combines the information about power consumption of issuing an alert notification and the event priority indicator associated with the alert.

19. The non-transitory machine-readable storage medium of claim 18, wherein the operation that combines the information about power consumption and the event priority indicator includes an operation that computes a linear combination of the information about power consumption and the event priority indicator each weighted by respective weight factors.

20. The non-transitory machine-readable storage medium of claim 17, further comprising operations that cause the computing device to generate a plurality of alert heaps each including respective one or more alerts, wherein the operation that prioritizes the alerts includes an operation that merge the plurality of alert heaps to generate a cost-biased leftist heap based on the cost values of the alerts in the plurality of alert heaps.

* * * * *